United States Patent [19]

Lazzari

[11] Patent Number: 5,168,408
[45] Date of Patent: Dec. 1, 1992

[54] MAGNETIC READING AND WRITING HEAD WITH MAGNETORESISTANT ELEMENT

[75] Inventor: Jean-Pierre Lazzari, Corenc, France

[73] Assignee: Commissariat a l'Energie Atomique, Paris, France

[21] Appl. No.: 636,107

[22] Filed: Dec. 31, 1990

[30] Foreign Application Priority Data

Jan. 18, 1990 [FR] France .................................. 90 00556

[51] Int. Cl.$^5$ .................................................. G11B 5/30
[52] U.S. Cl. ...................................................... 360/113
[58] Field of Search .......................................... 360/113

[56] References Cited

U.S. PATENT DOCUMENTS

| | | | |
|---|---|---|---|
| 3,887,945 | 6/1975 | Nepela et al. | 360/113 |
| 4,698,711 | 10/1987 | Vinal | 360/113 |
| 4,797,766 | 1/1989 | Enz | 360/113 |
| 4,803,581 | 2/1989 | Kira et al. | 360/113 |
| 4,816,947 | 3/1989 | Vinal et al. | 360/113 |

FOREIGN PATENT DOCUMENTS

| | | | |
|---|---|---|---|
| 0238110 | 9/1987 | European Pat. Off. | 360/113 |
| 2146481 | 4/1985 | United Kingdom | 360/113 |

*Primary Examiner*—David J. Severin
*Attorney, Agent, or Firm*—Oblon, Spivak, McClelland, Maier & Neustadt

[57] ABSTRACT

In order to improve the sensitivity of the head when reading, without excessively reducing its efficiency when writing, the magnetic circuit used is left open. The reading flux then re-closes, essentially across the magnetoresistant element (MR).

3 Claims, 2 Drawing Sheets

MAGNETIC READING AND WRITING HEAD WITH MAGNETORESISTANT ELEMENT

BACKGROUND OF THE INVENTION

1. Field of the Invention

The present invention relates to a reading and writing head with a magnetoresistant element. The invention essentially applies to so-called horizontal, thin-film heads. Such a head is shown in FIG. 1.

2. Discussion of the Background

FIG. 1 shows in section a horizontal head having an e.g. silicon semiconductor substrate 10, in which has been etched a recess 12. Within the latter a lower magnetic layer 14 has been electrolytically formed and has been extended by two vertical pads $16_1$, $16_2$, which are surrounded by a coil 18, which is embedded in an insulating layer 20. The magnetic circuit is completed by an upper pole piece subdivided into two portions $22_1$, $22_2$ by an amagnetic spacer 24. An e.g. Fe-Ni magnetoresistant element MR is placed beneath the amagnetic spacer 24. This element is obtained by photoetching using the spacer as the mask. It is therefore self-aligned with respect to the spacer. The head moves in front of a magnetic support 30 where the information to be read or written is recorded.

Such a head is described in French patent application 89 04060 filed by the Applicant on Mar. 29, 1989 and entitled "Magnetic head with magnetoresistance for longitudinal recording and process for the production of such a head".

The device functions as follows. On writing, the current flowing in the coil 18 creates a magnetic field and consequently an induction in the magnetic circuit. The field lines which open out around the spacer induce a magnetization in the support 30.

On reading, a magnetic information recorded in the support 30 produces a magnetic reading field and consequently an induction in the magnetic circuit. This induction in part re-closes across the magnetoresistant element MR. Thus, there is a reading magnetization in the said element, which will lead to a variation of the resistance of the element.

SUMMARY OF THE INVENTION

Although satisfactory in certain respects, such heads suffer from the disadvantage linked with a relative weakness of the reading signal. This weakness is essentially due to the fact that the magnetic reading flux does not re-close entirely across the magnetoresistant element MR. Thus, on reading, the magnetic flux from the support 30 re-closes taking two different paths illustrated in the enclosed FIG. 2, namely a path (a) taken by the lower pole piece 14 and a path (b) which re-closes across the magnetoresistant element MR. Therefore part of the magnetic flux is not used in the reading stage.

The present invention aims at obviating this disadvantage. Therefore the invention recommends opening the magnetic circuit in such a way that the aforementioned path (a) is interrupted, so that path (b) is given preference.

Naturally, the resulting improvement in the reading signal is obtained to the detriment of the writing signal. It is the merit of the present invention that it has been able to define an acceptable compromise between these two opposing objectives and to have shown that, despite a reduction in efficiency on writing, the head could be improved on an overall basis with respect to its performance characteristics, as a result of the considerable increase in its sensitivity in reading.

More specifically, the present invention relates to a magnetic reading and writing head comprising a magnetic circuit with a head gap, a magnetoresistant element located beneath the head gap and a conductive coil, characterized in that the magnet circuit is open.

In a first variant, the head according to the invention is characterized in that the magnetic circuit only comprises an upper pole piece.

In a second variant, the head according to the invention is characterized in that the magnetic circuit comprises an upper pole piece and a lower pole piece parallel to the upper pole piece, but not magnetically connected thereto.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
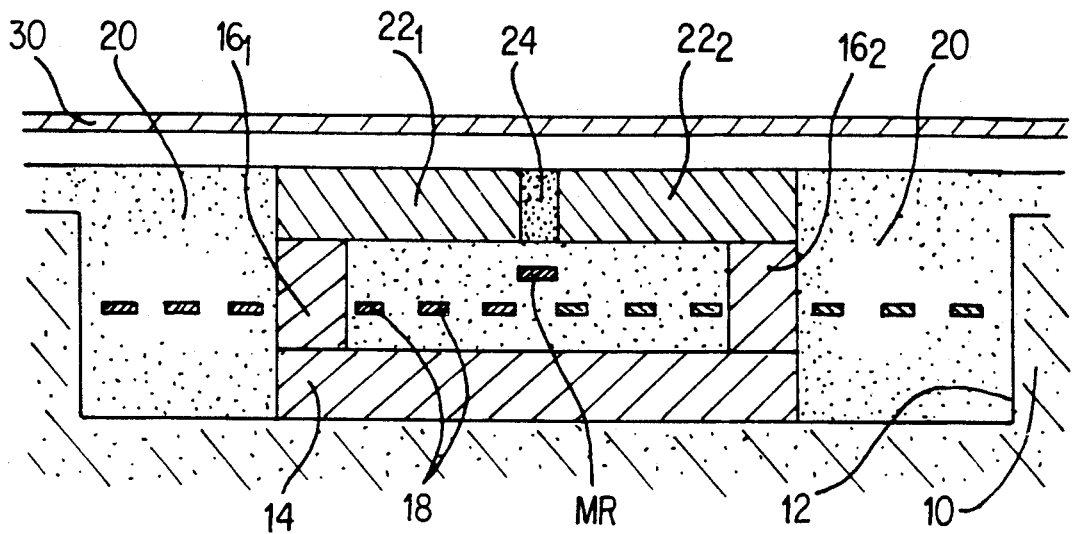
FIG. 1, already described, a prior art magnetic head.
Figure 2:
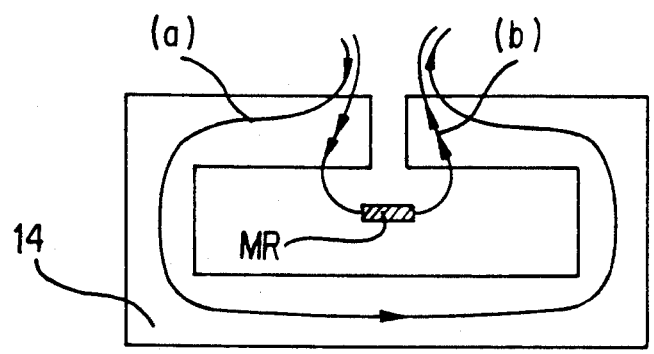
FIG. 2, already described, two reading flux closing paths according to the prior art.
Figure 3:
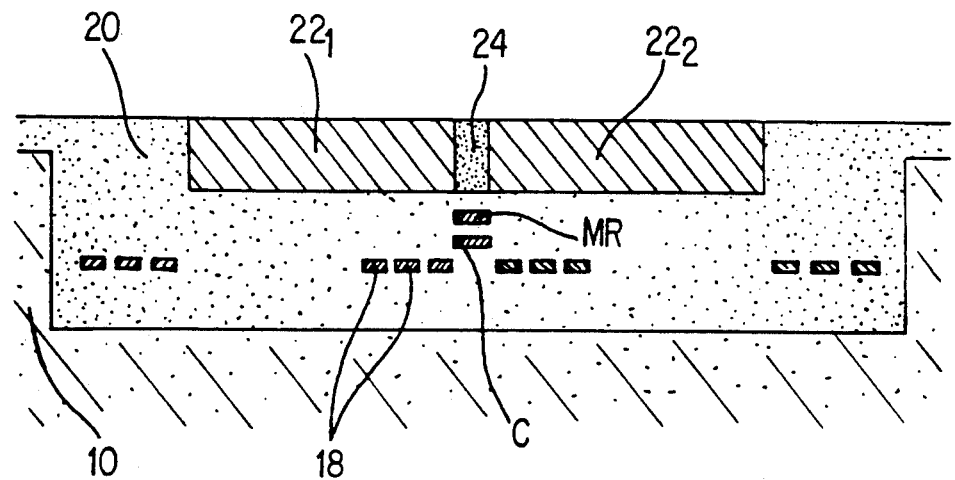
FIG. 3, a head according to the invention in a first embodiment thereof.

The head shown in FIG. 3 has elements in common with that of FIG. 1. These elements carry the same references. They consist of the substrate 10, the coil 18 embedded in the insulator 20, the upper pole piece formed by two portions $22_1$ and $22_2$, the head gap 24 constituted by an amagnetic spacer and finally the magnetoresistant element MR. However, unlike in the prior art heads, there is no lower pole piece and no pillar. The reading head consequently completely re-closes by the element MR. On writing, the flux created is naturally greatly weakened and drops to approximately 400 Oe (i.e. approximately 32000 A/m) instead of 6000 Oe (i.e. approximately 480000 A/m) in the case of the head according to FIG. 1. However, said value remains adequate.

It will be seen that the coil 18 is closer to the head gap than in the head according to FIG. 1, which somewhat improves the writing field. It is also possible to move the upper pole piece towards the plane of the coil.

The head of FIG. 3 also comprises an element C, which is a conductive layer, into which can be injected a polarizing current in order to produce a polarization induction in the element MR. The induction at rest (i.e. in the absence of a reading field) is then inclined with respect to the current lines used for reading the resistance variation of the element MR. Such an arrangement is known per se and is e.g. described (in the case of a vertical head) in U.S. Pat. No. 4,734,644.

However, the presence of such a conductor is not obligatory. Preference compared therewith can be given to a so-called barber pole conductive layer deposited on the actual element MR and creating an oblique current with respect to the longitudinal axis of the element MR. A barber pole means is described in the article by M. G. J. HEIJMAN et al entitled "Multi-track magnetic heads in thin-film technology", published in "Philips Technical Review", vol. 44, no. 6, December 1988, pp 169-178.

Figure 4:
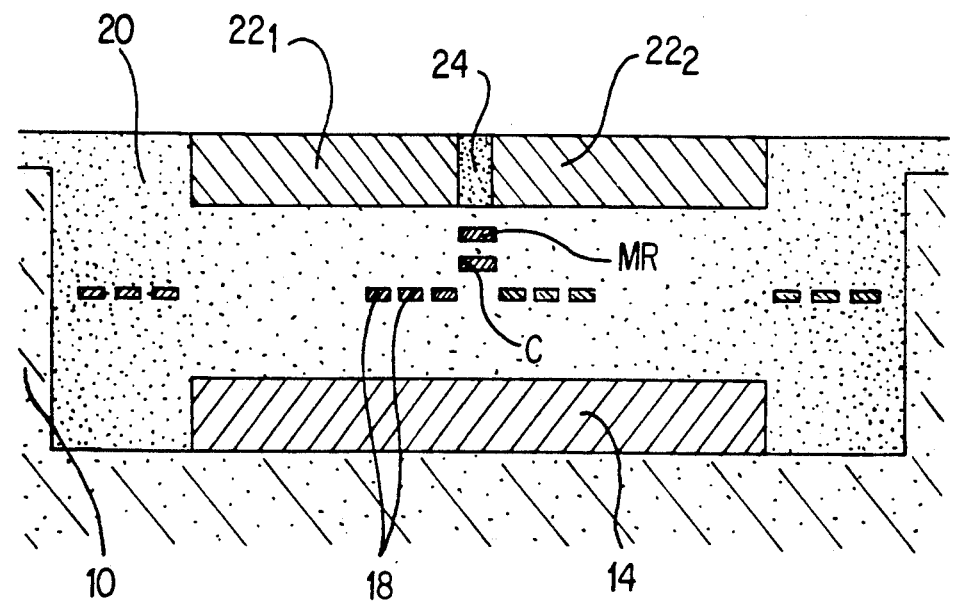
FIG. 4, a head according to the invention in a second embodiment thereof.

The head of FIG. 4 differs from that of FIG. 3 by the addition of a lower pole piece 14. The writing field increases somewhat and rises to 2400 Oe (i.e. 192000 A/m). The lower pole piece has the effect of magnetically shielding the head and preventing external interference fields from disturbing the magnetoresistant element MR.

Whichever variant is used, it is possible to use the conductor element C as a reading induction compensating means, as described in the earlier-dated French patent application filed by the Applicant on Jan. 17, 1990 under No. EN 90 00490 and entitled "Magnetic head with magnetoresistant element and current control".

I claim:

1. A magnetic head for reading and writing, which comprises:
    a substrate which has a recess, said recess having a bottom;
    an insulating material which fills said recess, said insulating material having a front surface parallel to said bottom of said recess;
    a first magnetic pole embedded in said insulating material and flush with said front surface, said first magnetic pole comprising two portions separated by an amagnetic spacer;
    a coil embedded in said insulating material and located between said bottom of said recess and said first magnetic pole;
    a magnetoresistant element embedded in said insulating material and located between said coil and said amagnetic spacer.

2. A magnetic head for reading and writing, which comprises:
    a substrate having a recess with a bottom;
    an insulating material which fills said recess, said insulating material having a front surface parallel to said bottom of said recess;
    a first magnetic pole embedded in said insulating material and at said bottom of said recess;
    a second magnetic pole having two portions separated by an amagnetic spacer, said second magnetic pole embedded in said insulating material and flush with said front surface;
    a coil embedded in said insulating material and located between the first and second magnetic poles;
    a magnetoresistant element embedded in said insulating material and located between said coil and said amagnetic spacer.

3. A magnetic head according to one of claims 1 and 2, wherein:
    said magnetoresistive element and said first magnetic pole form a preferred magnetic path therebetween.

* * * * *